United States Patent [19]

Kurz et al.

[11] Patent Number: 4,718,050

[45] Date of Patent: Jan. 5, 1988

[54] OPTICAL SCANNER AND READER FOR INFORMATION CONTAINED IN LIGHT REFLECTED FROM MOVING OPTICAL RECORDS

[75] Inventors: Arthur Kurz, VS-Pfaffenweiler; Hans-Robert Kühn, St. Georgen, both of Fed. Rep. of Germany

[73] Assignee: Deutsche Thomson-Brandt GmbH., Villingen-Schwenningen, Fed. Rep. of Germany

[21] Appl. No.: 628,770

[22] Filed: Jul. 9, 1984

[30] Foreign Application Priority Data

Jul. 9, 1983 [DE] Fed. Rep. of Germany ....... 3324861

[51] Int. Cl.$^4$ .................. G11B 7/00; G11B 21/10
[52] U.S. Cl. .......................... 369/44; 369/46
[58] Field of Search .............. 369/32, 33, 41, 44, 369/45, 46

[56] References Cited

U.S. PATENT DOCUMENTS

| | | | |
|---|---|---|---|
| 3,962,688 | 6/1976 | Natanael | 369/44 |
| 4,236,232 | 11/1980 | Jansen et al. | 369/33 |
| 4,239,942 | 12/1980 | Van Alem et al. | 369/44 |
| 4,282,598 | 8/1981 | Elliott | 369/44 |
| 4,302,830 | 11/1981 | Hamaoka et al. | 369/45 |
| 4,330,880 | 5/1982 | Van Dijk | 369/33 |
| 4,342,435 | 8/1982 | Kallmeyer et al. | 369/45 |
| 4,397,009 | 8/1983 | Eriksson | 369/44 |
| 4,494,154 | 1/1985 | Akiyama | 369/33 |
| 4,561,081 | 12/1985 | Janssen et al. | 369/46 |

Primary Examiner—Aristotelis M. Psitos
Assistant Examiner—James E. Tomassini
Attorney, Agent, or Firm—Horst M. Kasper

[57] ABSTRACT

The invention provides a reader and scanner, in particular for the reading of audio and/or video information recorded on plate-shaped information carriers. A scanning head can be pivoted around an axis in order to provide fine control. The scanning head is maintained in a defined middle position with springs. A magnetic circuit is constructed of a permanent magnet, pole shoes and a coil with a core provides a controllable or automatically controllable movement of the scanning head. The displacement of the scanning head can be determined with a piezoelectric converter, which is disposed between one of the two springs and the support associated with the pole shoes. Desired displacements of the scanning head can be obtained with a second electromechanical converter, which is disposed between the other spring and the other support, after application of a suitable voltage.

14 Claims, 5 Drawing Figures

OPTICAL SCANNER AND READER FOR INFORMATION CONTAINED IN LIGHT REFLECTED FROM MOVING OPTICAL RECORDS

BACKGROUND OF THE INVENTION

1. Field of the Invention

The present invention relates to a reading device for the optical scanning of informations on a surface reflecting the light of a moving plate-shaped carrier.

2. Brief Description of the Background of the Invention Including Prior Art

Reading provisions, also called shortly optical scanners serve the reading of audio and/or video informations, which are stored on an audio or video plate. They are in principle also suited for the reading of other optically readable data for data processing. The principle of the storage and of the reading of optically readable data is illustrated in general in Philips Technical Review 40, 151/155, 1982, No. 6.

Usually plate-shaped rotating recording carriers are employed, such as picture storage and video plates. However, also other storage methods are applicable, as far as these light reflecting surfaces are employed for the storage of optically readable data.

The reading provision comprises substantially a scanning head with a light source, which is in general a laser light generating semiconductor, as well as an optic system, which generates one or several light spots on a carrier surface. The scanning head is further provided with means for separating the reflected light from the emitted light such as for example as a beam divider as well as with detection elements for the conversion of the detected light into electrical signals.

Since the track density is very high, the scanning head has to follow the track with high precision and in particular with a tolerance of plus-minus 0.1 micrometer of the recorded track. This accuracy cannot be reached by mechanical precision, since alone deviations based on the eccentricity of the recording carrier and of the recording apparatus amount to a multiple of the above recited tolerance range (up to 3000 micrometer).

Therefore control provisions are required, which lead the scanning head controlled by the recorded track.

It is known to provide a coarse control with larger steps for guiding the arms supporting the scanning head and a fine control with smaller steps for the guiding of the head disposed pivotably at the arm. This keeps the effective masses, which are to be moved during the fine control, small, and a rapid control is made possible.

If the displacement motion of the following scanning head surpasses a preset threshold value, then a switching from fine control to coarse control is performed.

According to a known principle, where the scanning head is maintained in a defined medium position and is moved against the restoring force of an elasticity, then the maximum value of the electric current flowing through the coil for the radial fine-drive is a measure for the threshold.

Narrow pulses occuring in an automatic control circuit of an apparatus of this kind can already surpass the threshold for the switching on of the coarse drive, even though the latter has not reached the mechanical threshold for the switching of the fine drive setting to a coarse drive setting because of the narrow pulse width and based on the mechanical inertia of the scanning head. In order to avoid this, such pulses have to be suppressed, and for example kept away from the threshold provision by way of a low pass filter. On the other hand pulses, which correspond to an actual radial error deviation of the light spot versus the track, cannot be influenced by such a low pass filter. Therefore, a compromise has to be accomplished with such therehold provision between the suppression of disturbing values and the transmission of the desired correction signals.

This compromise has not to be taken if the actual deviation of the scanning head from the set position or from a reference position is determined. In case of analog record players (for example the type SL3 or SL5 of the company Technics) the deviation of the sound pick-up is determined immediately via a light barrier arrangement, where a diaphragm is applied at the movable sound pick-up arm, which is disposed on the light path between a light source and a two segment photo detector. The light diaphragm and the photo elements are disposed such that the segments in case of a deviation of the sound pick-up are illuminated differently strong. An automatic control signal for the radial position correction of the sound pick-up can be determined from the two electrical signals of the sound pick-up element. Pulses occurring in the automatic control circuit which are not followed by a motion of the sound pick-up are not determined in contrast to the above described arrangement and therefore they cannot lead to an erroneous correction.

Such a light barrier arrangement is relatively expensive because of the required precision and is subject to disturbances because of the danger of different soiling or aging of the photoelement segments. In addition, this light barrier arrangement itself cannot be employed to produce controlled desired displacement motions of the scanning head.

SUMMARY OF THE INVENTION

1. Purposes of the Invention

It is an object of the present invention to provide an optical scanner for reading information recorded on the light reflecting surface of a moving plate shaped carrier, where small pulses are determined and, if appropriate, the small pulses are suppressed.

It is another object of the invention to provide an optical scanner with a threshold provision, where the displacement of the scanning head is determined immediately, where however desired displacements of the scanning head can be achieved via the same control circuit.

It is a further object of the present invention to use electromechanical converters for improving the capabilities of a scanning head to accurately follow the tracks on an optical record.

These and other objects and advantages of the present invention will become evident from the description which follows.

2. Brief Description of the Invention

The present invention provides a reading provision for optical scanning of information recorded on the light reflecting surface of a moving plate-shaped carrier which comprises an arm movably attached to a casing, a scanning head movably mounted to the arm, a light source attached to the scanning head, an optical system incorporated into the scanning head for generating at least one light spot on a surface of the plate-shaped carrier, detection means for converting the reflected light coming from the light spot into electrical signals, an elastically springing restoring force member disposed between the arm and the scanning head, a coarse control mechanism for adjusting the arm position, fine control for adjusting the pivotably disposed scanning head against the effect of the elastically springing restoring force member, an electromechanical converter serving as a threshold provision disposed in the force flow between the scanning head, the elastic restoring force member and the spring support and having an output, and a threshold control circuit connected to the output of the electromechanical converter for generating a signal effecting a control change from a fine control to a coarse control and vice versa if the lateral excursion of the following scanning head motion exceeds a preset threshold value.

Means can be provided at the scanning head for separating the reflected light from the emitted light. The arm can end in dual support brackets. The scanning head is preferably supported by springs disposed on two opposite sides between the support brackets. Two electromechanical converters can be provided, which are disposed between a respective bracket and spring element. A difference circuit can combine the voltage outputs of the electromechanical converters for producing a control output.

The electromechanical converter can be disposed between a respective bracket and spring element. A second electromechanical converter can be disposed between the second opposite side bracket and spring element and can operate as a vibration generator powered by the output of the low frequency control signal generator. A difference circuit can compare the voltage output of the first electromechanical converter with a reference voltage corresponding to the middle position for producing a control signal output for adjusting the amplitudes of the low frequency control signal. The control signal can be of a frequency from about 200 to 1000 Hertz and of preferably from about 400 to 800 Hertz. The effected movement distance of the scanning head in the area of the light spot can be from about 0.02 to 0.1 micrometer. The first electromechanical converter can be a piezoelectric converter provided as a longitudinal vibrator. A further piezoelectric converter can be disposed at one side of the scanning head as a bending vibrator which can place the scanning head into radial vibrations.

Alternatively, two electromechanical converters can be provided, which are disposed between a respective bracket and spring element, where each electromechanical converter comprises two individual elements of about equal construction and where one of the individual elements operates as a vibration generator and where the other individual element operates as a detector element. A difference circuit can combine the voltage outputs of the electromechanical converters for producing a control output.

There is also provided a method for optical scanning of information recorded on the light reflecting surface of a moving plate-shaped carrier which comprises movably attaching an arm to a casing, movably mounting a scanning head to the arm, attaching a light source to the scanning head, incorporating an optical system into the scanning head, generating at least one light spot on a surface of the plate-shaped carrier with the optical system, converting the reflected light coming from the light spot into electrical signals with a detection means, supporting the scanning head with an elastically springing restoring force member against the arm, adjusting the arm position with a coarse control mechanism, adjusting the movably disposed scanning head against the effect of an elastically springing restoring force member with a fine control, determining a threshold with an electromechanical converter disposed in the force flow between the scanning head, the elastic restoring force member and the spring support and having an output, and generating a signal effecting a control change from a fine control to a coarse control and vice versa with a threshold control circuit connected to the output of the electromechanical converter if the lateral excursion of the moving scanning head exceeds a preset threshold value.

The reflected light can be separated from the emitted light. A second electromechanical converter disposed between the second opposite side bracket and spring element and operating as a vibration generator can be powered with the output of a low frequency control signal generator. A further piezoelectric converter can be disposed at one side of the scanning head as a bending vibrator which can place the scanning head into radial vibrations.

This task is accomplished with an electromechanical converter, which is preferably a piezoelectrical converter, which is disposed in the force flow between scanning head, the elastically springing restoring force and a support fixed versus the scanning head. The electrical output value of the converter, and preferably its output voltage, is an immediate measure for the actual displacement of the scanning head, such that a controlled shift from a fine control to a coarse control can be initiated, if this output voltage surpasses a preset threshold.

According to a preferred embodiment where the scanning head is placed in a defined position with spring elements disposed on the two sides, there is furnished a converter proper between each of the two spring elements and the support in each case. The output voltages of the two converters are fed to a difference circuit, which derives the control signal from the two output voltages.

Piezoelectric converters are preferred in the context of the present invention, which are formed as simple longitudinal vibrators. Pressure and, respectively, tension forces are generated in the converters disposed on the two sides upon displacement movements of the fine drive and the forces entail oppositely directed piezo tensions, which are associated with each other in the above mentioned difference circuit for determining of the control value.

According to a further feature of the invention only one of the electromechanical converters can be employed for the determination of the radial deviation of the scanning head, while the other converter serves as a vibration generator. The output voltage of the first recited converter has to be compared in this case with a reference voltage corresponding to the middle position of the scanning head. The second converter serving as a vibration generator or emitter can be fed with defined electrical control signals, which displace the scanning head radially. Asymmetries of the optical system can possibly be compensated by cooperation of the vibration generator or, respectively, emitter and the receiver converter.

This arrangement is suitable to superimpose a low frequency vibration with a frequency of 600 Hertz and an amplitude of plus-minus 0.05 micrometer as it is explained in the initially recited publication "The Compact Disc Digital Audio system" at page 154. The low frequency control vibration is generated here with the mechanism present for the fine drive. This mode of operation has the disadvantage that on the one hand the comparatively sensitive fine drive is engaged with the various control signals. On the other hand errors also enter into the control vibrations, which are caused by the characteristic of the fine drive.

The invention does not have these disadvantages, where the drive and the error correction are separated from each other.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 1 and 1a are perspective views of a scanning head according to a first embodiment;

FIG. 3 is a perspective view of a scanning head according to a second embodiment of the invention;

DESCRIPTION OF INVENTION AND PREFERRED EMBODIMENT

In accordance to the invention there is provided an optical scanning provision for the light reflected from a surface of a moving plate-shaped carrier. A scanning head, incorporating a light source, an optical system for generating at least one light spot on the carrier surface, means for separating the reflected light from the emitted light, detection elements for converting the reflected light into electrical signals, is pivotably disposed at an arm. A coarse control for guiding the arm in larger steps as well as a fine control for guiding the pivotably disposed head against the force of an elastic springing restoring member in small steps are provided, where a threshold provision is furnished, which effects a switching from fine to coarse control, if the displacement movement of the guided scanning head surpasses a preset threshold value. The threshold provision comprises at least one electromechanical converter, which is preferably a piezoelectric converter, which is disposed in the area of the force flow between the scanning head, the elastically springing restoring head and a support fixed versus the scanning head. The electrical output of the electromechanical converter, preferably an output voltages fed to the control for changing from fine to coarse control.

The scanning head can be held in a defined middle position between two supports with spring elements disposed on two sides. A converter can be disposed between each spring element and respective support and the output voltage of the converter can be fed to a difference circuit for generating a control signal. A converter driven with a low frequency control signal can serve as a vibration generator and a second converter can serve as a receiver, where the output voltage of the receiver is compared with a reference voltage corresponding to a middle position and it serves for the amplitude control of the low frequency control signal. The low frequency control signal can have a frequency of about 600 Hertz and a displacement of the scanning head can be effected in the area of the light spot of plus-minus 0.05 micrometer. Each of the two piezoelectric converters in each case can be provided from two individual elements of the same construction. In each case one of the individual elements can be connected as a vibration generator and the other as a receiver. A piezoelectric converter 21 can be provided as a receiver in the form of a longitudinal vibrator between one of the two spring elements 18 and the support 19. A piezoconverter 25 can be disposed in the form of a bending vibrator at a scanning head casing 11b as a vibration generator and the scanning head 11 can be put into radial vibrations with the piezoconverter 25.

A scanning provision is shown in FIG. 1. The scanning provision is attached with a support 10 to an arm or carriage, which can be adjusted in larger steps for the purpose of coarse control during the scanning of the information carrier. The elements recognizable in detail from the drawing are for the fine drive and the support disposition of the scanning head.

The scanning head 11 serving for the reading of the information hides in its inside the light source and the optics for the generation of the light bundle exiting upwardly in the drawing and thus for the generation of the light spot. In addition, a beam divider is disposed in the scanning head for separating the reflected light from the emitted light as well as a component group, which includes semiconductor segments and elements, which convert the reflected light into electrical signals. The optical system 11a of the scanning head 11 is adjustably connected via leaf springs 12 to the head support 13. The optical system 11a can be adjusted in axial direction for focussing the light spot on the carrier surface with a preferably electromagnetical provision, which is not illustrated here. The head support 13, which is solidly connected to the case 11b of the scanning head 11, can be pivoted around the rotation axis 14 with the fine drive illustrated below. This fine drive comprises substantially a magnetic circuit with permanent magnets 15 disposed at the carrier 10. Pol shoes 16 and the coil 17, which is disposed in the rearside of the case 11b, are located at the ends of the permanent magnets 15. The scanning head can be pivoted against the restoring forces of elastically acting springing restoring members, which are the springs 18 in the instant embodiment. The symmetrically formed and pretensioned springs 18 are clamped between the supports 19 and the scanning head casing 11b. Pressure or, respectively, tension sensitive piezoelectrical converters 20 and 21 are provided between the ends of the supports 19 and the springs 18. The springs 18 are supported against the piezoelectric converters via pressure and attachment plates 23 for the generation of uniform surface pressures and positioning. In case of symmetric positioning of the scanning head equal output voltages $U_1$ and $U_2$ are generated by the piezoelectric converters 20 and 21. The pressure loads of the converters 20 and 21 change upon movement of the scanning head from the middle position, which results in different output voltages $U_1$ and $U_2$. The output voltages therefore are a measure for the radial displacement of the scanning head.

A desired thickness change of the converter can be achieved by applying of a voltage, for example of the voltage $U_1$, to the converter 20 and thus a desired displacement motion of the scanning head can be achieved. This property is employed in a feature of the invention, where the scanning head and therewith the optical system are controllably displaced.

Figure 2:
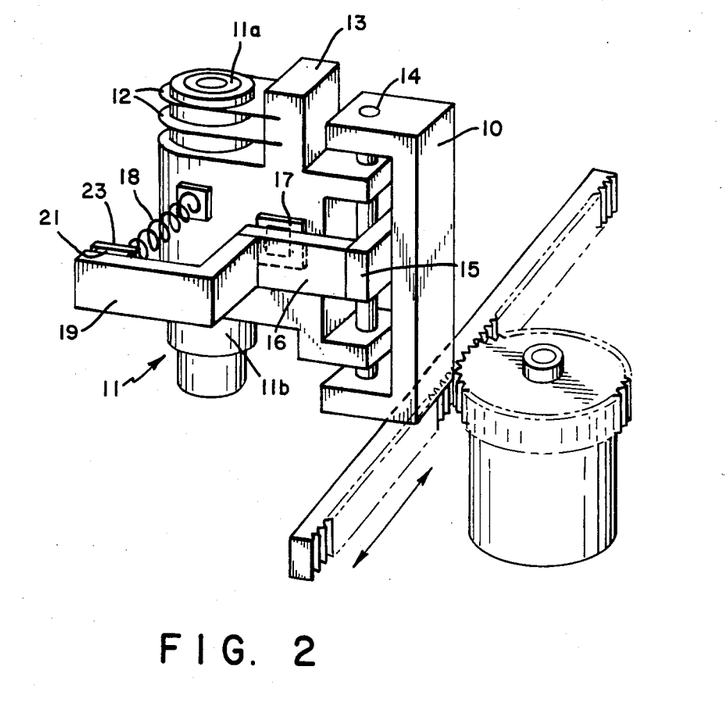
FIG. 2 is a perspective view of a piezoelectric converter, where the voltage generator and the receiver are combined into one unit.

The converters 20 and 21, which are subdivided into two individual elements according to FIG. 1, can also be combined with each other into a compact element, as illustrated in FIG. 2. In this embodiment two converters 20' and 21' are combined to a compact element, which is positioned between support 19 and pressure and attachement plate 23. A voltage $U_S$ can be applied to the converter 20' either as a correction value or as a sweeping voltage, while the voltage $U_E$ generated at the converter 21' can be employed as a control signal.

FIG. 3 shows a modification of the scanning head of FIG. 1. The same parts are designated with the same numerals as in FIG. 1. A piezoelectric bending vibrator 20 with a fixed end is attached immediately to the casing 11b of the scanning head according to FIG. 3 instead of the converter 20 of the embodiment of FIG. 1. The other end of the bending vibrator 25 is free and can be brought to vibrate in the direction of the double arrow S upon the application of an alternating voltage $U_S$. The scanning head 11 is pivotably disposed around the axis 14 via the head support 13 and against the force of the springs 18, where a fine drive for radial displacement is generally designated as 26 and actuates the head support 13 and thus the head 11. This fine drive is realized according to the embodiment of FIGS. 1 and 3 via the electromagnetic circuit 15, 16, and 17.

The threshold provision for the switching of the fine control to the coarse control is not shown in the drawing. A conventional arrangement of a 4-segment photodetector 27 serves as a detection element, which reads both the data information as well as the error signals.

Figure 4:
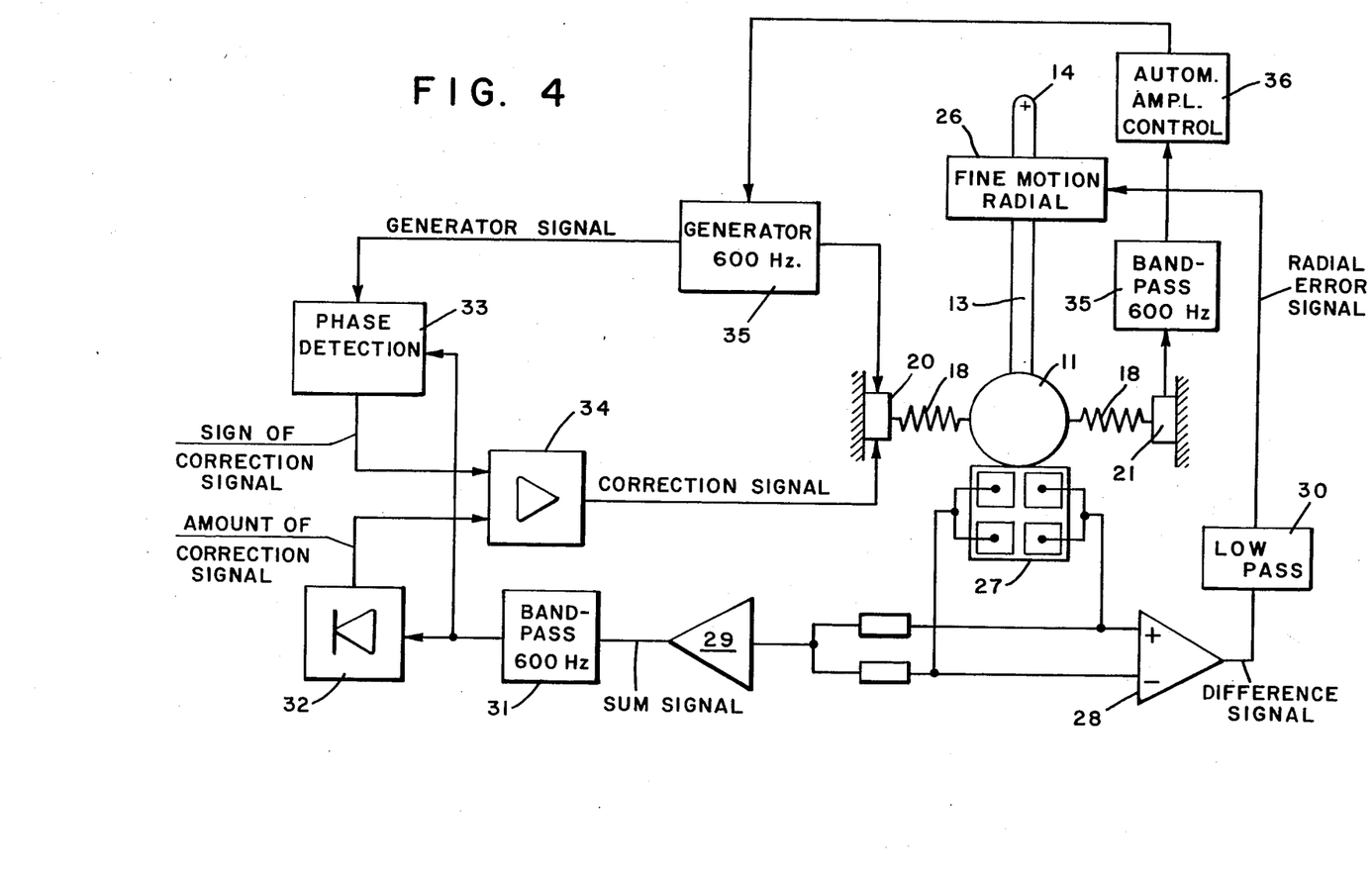
FIG. 4 is a block circuit diagram of an automatic control circuit for the invention scanning head.

The component groups and functions important for the automatic control of the scanning head are illustrated by way of the block circuit diagram of FIG. 4.

A difference signal is formed from the output signals generated by the photo element 27 with the operational amplifier 28. The difference signal is fed as a radial error signal to the radial fine drive 26 via a low pass filter 30. As mentioned in the introduction to the description, short disturbance pulses are suppressed with the low pass filter 30 such that these do not effect a radial correction of the position of the scanning head. The second operational amplifier 29 forms a sum signal from the signals generated by the photo element 27, from which a correction signal is derived in the way described in the following. The correction signal serves for the control of the converter 20 for the radial position correction of the scanning head 11. Such correction signals occur in case of asymmetries in the opto-electrical circuit, that is for example in case of soiled or aged photo element segments or, respectively, an unsymmetrical radiation of the laser light source. The sum signal generated at the output of the operational amplifier 29 in this case is led via a band pass filter 31 and the middle frequency of the band pass filter corresponds to the frequency of the generator 35, which according to the present embodiment has a frequency of 600 Hertz. The absolute value of the correction signal is determined with the rectifier 32 after passing of the band pass filter 31. The phase position of the sum signal and therewith the sign of the correction signal are determined by comparing the sum signal with the generator signal in a phase detector 33. The correction signal with the right sign appears at the output of the operational amplifier 34, the inputs of which are connected on the one hand to the output of the rectifier 32 and on the other hand to the output of the phase detector 33, in case asymmetries occur in the electro-optical system. The piezoelectric converter 20 here provided according to the invention as a vibration generator is controlled with these correction signals. It is placed into vibration with a sweep frequency, here 600 Hertz, from the generator 35. The vibration is transmitted to the scanning head 11 via the elastic spring 18. The motion of the scanning head 11 in turn passes to the converter 21 serving as a receiver. The output voltage of the converter 21 is fed to a circuit 36 after filtering via the band pass filter 37, the middle frequency of which is again 600 Hertz. The circuit 36 provides an automatic amplitude control for the generator 35.

It will be understood that each of the elements described above, or two or more together, may also find a useful application in other types of optical information scanning system configurations and record reading procedures differing from the types described above.

While the invention has been illustrated and described as embodied in the context of an optical scanner and reader for information on optical records, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A reading provision for optical scanning of information recorded on the light reflecting surface of a moving plate-shaped carrier comprising
   a casing;
   an arm movably attached to the casing;
   a scanning head movably mounted to the arm;
   a light source attached to the scanning head;
   an optical system incorporated into the scanning head for generating at least one light spot on a surface of the plate-shaped carrier;
   detection means for converting the reflected light coming from the light spot into electrical signals;
   an elastically springing restoring force member disposed between the arm and the scanning head;
   a coarse control mechanism for adjusting the arm position; fine control for adjusting the pivotably disposed scanning head against the effect of the elastically springing restoring force member;
   an electromechanical converter serving as a threshold provision disposed in the force flow between the scanning head, the elastic restoring force member and the spring support and having an output; and
   a threshold control circuit connected to the output of the electromechanical converter for generating a signal effecting a control change from a fine control to a coarse control and vice versa if the lateral excursion of the following scanning head motion exceeds a preset threshold value.

2. The reading provision for optical scanning of information according to claim 1 further comprising means at the scanning head for separating the reflected light from the emitted light.

3. The reading provision for optical scanning of information according to claim 1
wherein the arm ends in dual support brackets;
wherein the scanning head is supported by springs disposed on two opposite sides between the support brackets;
wherein two electromechanical converters are provided, which are disposed between a respective bracket and spring element; and
further comprising
a difference circuit for combining the voltage outputs of the electromechanical converters for producing a control output.

4. The reading provision for optical scanning of information according to claim 1
wherein the arm ends in dual support brackets;
wherein the scanning head is supported by springs disposed on two opposite sides between the support brackets;
wherein the electromechanical converter is disposed between a respective bracket and spring element; and
further comprising
a low frequency control signal generator;
a second electromechanical converter disposed between the second opposite side bracket and spring element operating as a vibration generator powered by the output of the low frequency control signal generator;
a difference circuit for comparing the voltage output of the first electromechanical converter with a reference voltage corresponding to the middle position for producing a control signal output for adjusting the amplitudes of the low frequency control signal.

5. The reading provision for optical scanning of information according to claim 4 wherein the control signal is of a frequency from about 200 to 1000 Hertz and where the effected motion distance of the scanning head in the area of the light spot is from about 0.02 to 0.1 micrometer.

6. The reading provision for optical scanning of information according to claim 4 wherein the first electromechanical converter is a piezoelectric converter provided as a longitudinal vibrator;
further comprising
a further piezoelectric converter disposed at one side of the scanning head as a bending vibrator which can place the scanning head into radial vibrations.

7. The reading provision for optical scanning of information according to claim 1
wherein the arm ends in dual support brackets;
wherein the scanning head is supported by springs disposed on two opposite sides between the support brackets;
wherein two electromechanical converters are provided, which are disposed between a respective bracket and spring element, where each electromechanical converter comprises two individual elements of about equal construction and where one of the individual elements operates as a vibration generator and where the other individual element operates as a detector element; and
further comprising
a difference circuit for combining the voltage outputs of the electromechanical converters for producing a control output.

8. A method for optical scanning of information recorded on the light reflecting surface of a moving plate-shaped carrier comprising
movably attaching an arm to a casing;
movably mounting a scanning head to the arm;
attaching a light source to the scanning head;
incorporating an optical system into the scanning head;
generating at least one light spot on a surface of the plate-shaped carrier with the optical system;
converting the reflected light coming from the light spot into electrical signals with a detection means;
supporting the scanning head with an elastically springing restoring force member against the arm;
adjusting the arm position with a coarse control mechanism;
adjusting the movably disposed scanning head against the effect of an elastically springing restoring force member with a fine control;
determining a threshold with an electromechanical converter disposed in the force flow between the scanning head, the elastic restoring force member and the spring support and having an output; and
generating a signal effecting a control change from a fine control to a coarse control and vice versa with a threshold control circuit connected to the output of the electromechanical converter if the lateral excursion of the moving scanning head exceeds a preset threshold value.

9. A method for optical scanning of information according to claim 8 further comprising
separating the reflected light from the emitted light.

10. The method for optical scanning of information according to claim 8
wherein the arm ends in dual support brackets;
wherein the scanning head is supported by springs disposed on two opposite sides between the support brackets;
wherein two electromechanical converters are provided, which are disposed between a respective bracket and spring element; and
further comprising
combining the voltage outputs of the electromechanical converters for producing a control output with a difference circuit.

11. The method for optical scanning of information according to claim 8
wherein the arm ends in dual support brackets;
wherein the scanning head is supported by springs disposed on two opposite sides between the support brackets;
wherein the electromechanical converter is disposed between a respective bracket and spring element; and
further comprising
powering a second electromechanical converter disposed between the second opposite side bracket and spring element and operating as a vibration generator with the output of a low frequency control signal generator;
comparing the voltage output of the first electromechanical converter with a reference voltage corresponding to the middle position in a difference circuit for producing a control signal output for adjusting the amplitudes of the low frequency control signal.

12. The method for optical scanning of information according to claim 11 wherein a control signal is of a frequency of about from about 200 to 1000 Hertz and where the effected motion distance of the scanning head in the area of the light spot is from about 0.02 to 0.1 micrometer.

13. The method for optical scanning of information according to claim 11 wherein the first electromechanical converter is a piezoelectric converter provided as a
  longitudinal vibrator;
  further comprising
  disposing a further piezoelectric converter at one side of the scanning head as a bending vibrator which can place the scanning head into radial vibrations.

14. The method for optical scanning of information according to claim 8 wherein the arm ends in dual support brackets;
  wherein the scanning head is supported by springs disposed on two opposite sides between the support brackets;
  wherein two electromechanical converters are provided, which are disposed between a respective bracket and spring element, where each electromechanical converter comprises two individual elements of about equal construction and where one of the individual elements operates as a vibration generator and where the other individual element operates as
  a detector element; and
  further comprising
  combining the voltage outputs of the electromechanical converter with a difference circuit for producing a control output.

* * * * *